UNITED STATES PATENT OFFICE.

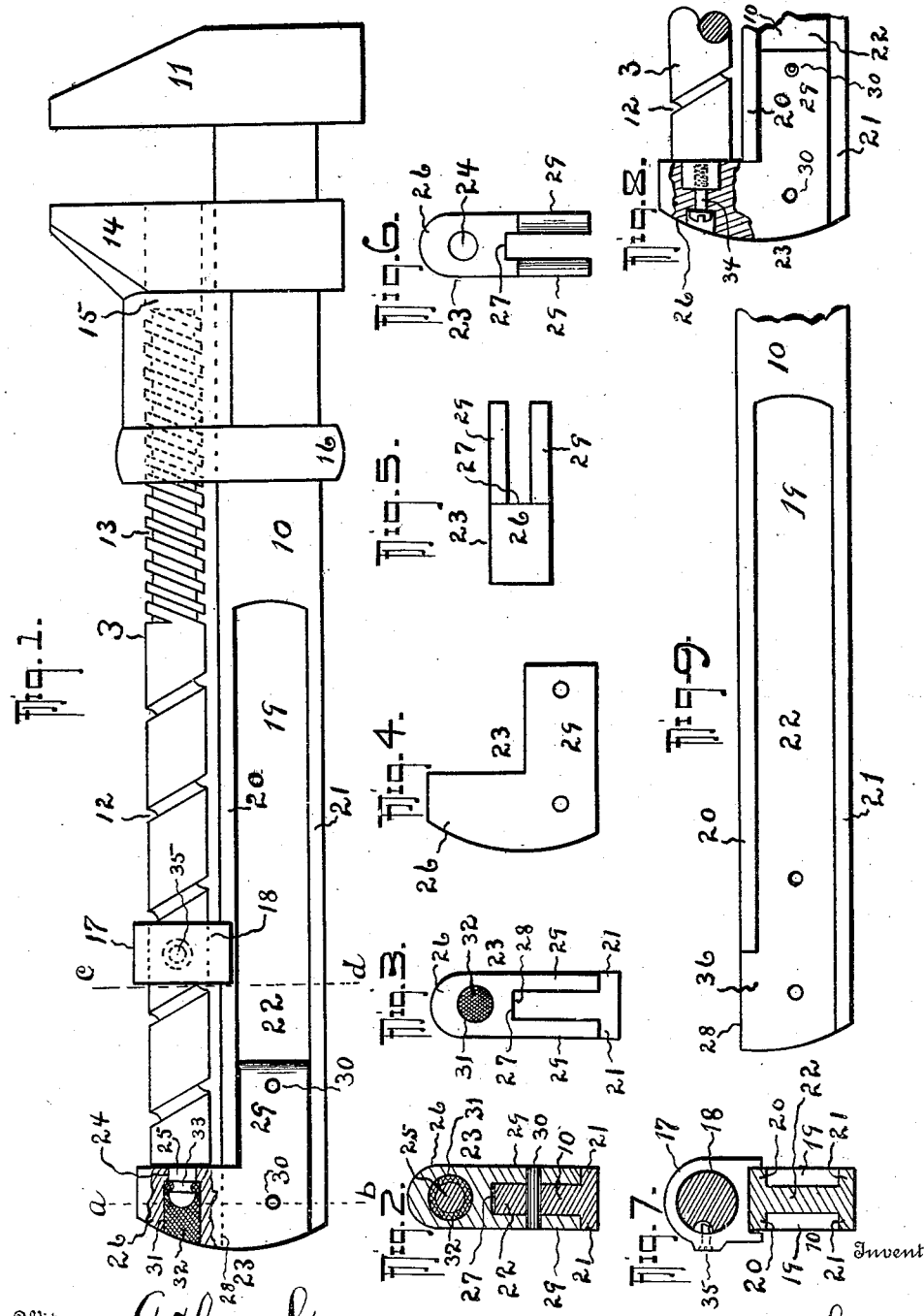

HIRAM A. STURGES, OF OMAHA, NEBRASKA.

WRENCH.

No. 886,437.  Specification of Letters Patent.  Patented May 5, 1908.

Application filed January 23, 1908. Serial No. 412,256.

*To all whom it may concern:*

Be it known that I, HIRAM A. STURGES, a citizen of the United States, residing at Omaha, in the county of Douglas and State of Nebraska, have invented certain new and useful Improvements in Wrenches, of which the following is a specification.

This invention relates to improvements in wrenches of the class employing a double threaded spindle for operating the movable jaw, and has for its object the provision of a wrench consisting of parts which may be conveniently assembled, which may be economically constructed, durable in use and reliable in operation.

The invention also has reference to the bearing upon the distal end of the shank. Various constructions have been employed for the support of the bearing head upon the end of the shank, the object in view being to furnish a support adequate to withstand the longitudinal strain communicated to this bearing from the movable jaw.

The present invention includes the formation of a bearing member, intended, by reason of the construction shown and described, to be more effective for this purpose than heretofore shown.

The invention consists of the combination and arrangement of parts as described herein, pointed out by the appended claims, and as illustrated in the drawing, wherein,—

Figure 1 is a side view of a wrench embodying the invention, a part of the bearing member being in section. Fig. 2 is a view sectioned on line *a b* of Fig. 1. Fig. 3 is a front view of the distal end of the wrench, showing the outer end of the bearing member. Figs. 4 and 5 are, respectively, side and plan views of the bearing member. Fig. 6 is a view of the inner end of the bearing member. Fig. 7 is a view sectioned on line *c d* of Fig. 1, looking to the jaws of the wrench. Fig. 8 is a side view, showing part of the distal end of the wrench, partly in section to illustrate a modified holding means for the spindle. Fig. 9 is a detail relating to Fig. 1 to clearly show the terminal of the shank, and web employed.

Referring now to the drawing for a more particular description, numeral 10 indicates the shank of the wrench, and 11 the integral jaw upon one end of the shank; 3 indicates the spindle, provided with threads 12 and 13 of reversed pitches.

Numeral 14 indicates the movable jaw with an opening 15, within which spindle 3 is adapted to thread; 16 indicates the strap which encircles the shank, this strap being integrally connected with jaw 14. A collar, indicated at 17, is provided with an opening 18 of sufficient diameter so that it may be loosely seated upon spindle 3.

Throughout a part of its length, the sides of shank 10 are preferably formed with longitudinally-depressed and oppositely-disposed parallel surfaces 19, to form oppositely-disposed, parallel, longitudinal ridges or flanges 20 and 21 adjacent, respectively, the upper and lower faces of the shank, and to form between said ridges or flanges 20 and 21 the web 22. While this construction is not important, it is convenient, since it operates to decrease the weight of the distal end of the shank without any appreciable loss of strength, and it furnishes a more secure mounting for arms 29 of the bearing member.

It will be noted that the present construction does not employ upon the shank any transverse corrugations or transverse ridges as a holding means for the bearing head, but the distal end of the shank is formed with oppositely-disposed, longitudinally-parallel side surfaces, and this construction allows the arms of the bearing member, presently to be described, to be passed longitudinally upon the shank to be conveniently secured thereon, as will be seen.

Numeral 23 indicates the bearing member, provided with socket 24 for the seating of pintle 25 of spindle 3. It will be understood, when using wrenches of this class, that stresses imparted to the movable jaw 14 are communicated directly to head 23. It is necessary that this bearing member be furnished with a strong support upon the shank, adequate to withstand the severe stresses incurred during operative use of the wrench; therefore, the bearing member is formed to comprise the head-portion 26 with a contact-face 27 adapted to have a seating upon the upper face 28 near the terminal of the shank, and having transverse and oppositely-disposed arms 29 seated longitudinally upon the shank. By this construction the bearing member may be readily adjusted, and may be secured upon the shank, as by rivets 30; and flanges 20 and 21 operate as additional holding means, as clearly shown in the drawing, since arms 29 may be normally disposed, contactingly, upon opposite sides of the web, intermediate said flanges.

It will be noted that there is no stress upon spindle 3 in a direction toward the jaws except the stress communicated thereto from manipulation of collar 17, and therefore a convenient mounting for pintle 25 may be made as shown in the drawing; an aperture 31 is formed in head 26 of a diameter greater than socket 24; any durable substance is then employed, as Babbitt metal, which, when melted, may be poured in the aperture, thereby furnishing a housing or plug 32 to encircle the annular groove 33 of the pintle; this housing prevents a removal of the pintle and holds the parts in operative position. This construction is intended to be positive in operation, and in use, is accompanied by very slight friction.

Fig. 8 illustrates a modified form of a holding means for the purpose of retaining the pintle in its socket, whereby screw 34, with countersunk head, engages the pintle of spindle 3, to prevent said spindle moving from its seating within the bearing-head; it is considered that, while the screw head may cause more friction than housing 32, it may be more convenient for some purposes.

From the description, operation will be readily understood. Sliding-collar 17 is provided with any convenient interior projection secured or attached thereto, as screw 35, which traverses the wall of the collar to engage and travel within thread 12; by manually pushing this collar in directions toward or from jaw 11, the space between jaws 11 and 14 will be increased or diminished, as desired.

In assembling the several parts, jaw 14 and strap 16 are first seated upon the shank by passing the distal end of the shank through their openings; spindle 3, with its collar thereon, is then adjusted within opening 15 of the movable jaw, and lastly, member 23 is placed in position, arms 29 passing over the end, longitudinally, to seatings upon opposite, parallel sides of the shank, and since the shank is preferably formed as an I-beam in cross section, as shown in Fig. 7, a portion of flanges 20 are removed, as shown at 36, and by reason of the construction shown, the bearing member is furnished a strong support upon the shank, adequate to withstand the severe longitudinal stresses imposed.

Having fully described the several parts and their uses, what I claim as new and desire to secure by Letters Patent is,—

In a wrench, the combination with a shank which is I shaped in cross section at its distal end, of a fixed head upon said shank, a movable head slidably disposed upon said shank, a spindle having a threaded portion adapted to engage said movable head, and an oppositely threaded portion, a nut adapted to engage said oppositely trheaded portion, members carried by said nut and engaging the shank to hold said nut against turning, an L shaped bearing member in which the distal end of the spindle is journaled the said bearing member having one leg thereof bifurcated, said bifurcated portion straddling the shank and extending and lying between the flanges and against the web of the I shaped portion of the shank and fastening devices which pass through said shank and said bearing member, said fastening devices being longitudinally spaced along the shank.

In testimony whereof I have affixed my signature in presence of two witnesses.

HIRAM A. STURGES.

Witnesses:
ARTHUR STURGES,
H. C. COMPTON.